INVENTORS
Norman G. Worley
Christopher Powell

BY *J.P.Moran*
ATTORNEY

United States Patent Office 3,393,496
Patented July 23, 1968

3,393,496
APPARATUS FOR SEPARATING VAPOR
AND LIQUID
Norman G. Worley, Sidcup, Kent, and Christopher
Powell, Tunbridge Wells, Kent, England, assignors
to Babcock & Wilcox, Limited, London, England,
a corporation of Great Britain
Filed Sept. 15, 1966, Ser. No. 579,656
Claims priority, application Great Britain, Sept. 17, 1965,
39,765/65
3 Claims. (Cl. 55—349)

ABSTRACT OF THE DISCLOSURE

A spherical vessel is provided with concentric rows of centrifugal separators positioned adjacent a horizontal diametrical plane of the vessels. A frusto-conical plate positioned in the lower portion of the vessel cooperates with annular plates and cylindrical baffles to define passageways for vapor-liquid streams leading from vapor-liquid inlets in the lower portion of the vessel to the separators. The separated vapor and liquid are separately discharged from the spherical vessel.

---

This invention relates to apparatus for separating vapour and liquid from a mixture of vapour and liquid, and, more particularly, to a steam and water separating drum for use in connection with a steam generating, heavy water, nuclear reactor in which a mixture of saturated steam and water is discharged from the reactor core and requires to be separated into its constituent parts.

According to the present invention, apparatus for separating vapour and liquid from a mixture of vapour and liquid includes a spherical or substantially spherical pressure vessel, a plurality of vapour and liquid separating means positioned adjacent the horizontal diametrical plane of the vessel each arranged to discharge separated vapour upwardly to a vapour space in the upper portion of the vessel having a vapour outlet and to discharge separated liquid downwardly to a chamber at the base of the vessel having a liquid outlet and a plurality of vapour and liquid mixture inlets distributed around the vessel above the junction of the chamber with the vessel.

The invention will now be described, by way of example, with reference to the accompanying, partly diagrammatic drawings, in which.

Figure 1:
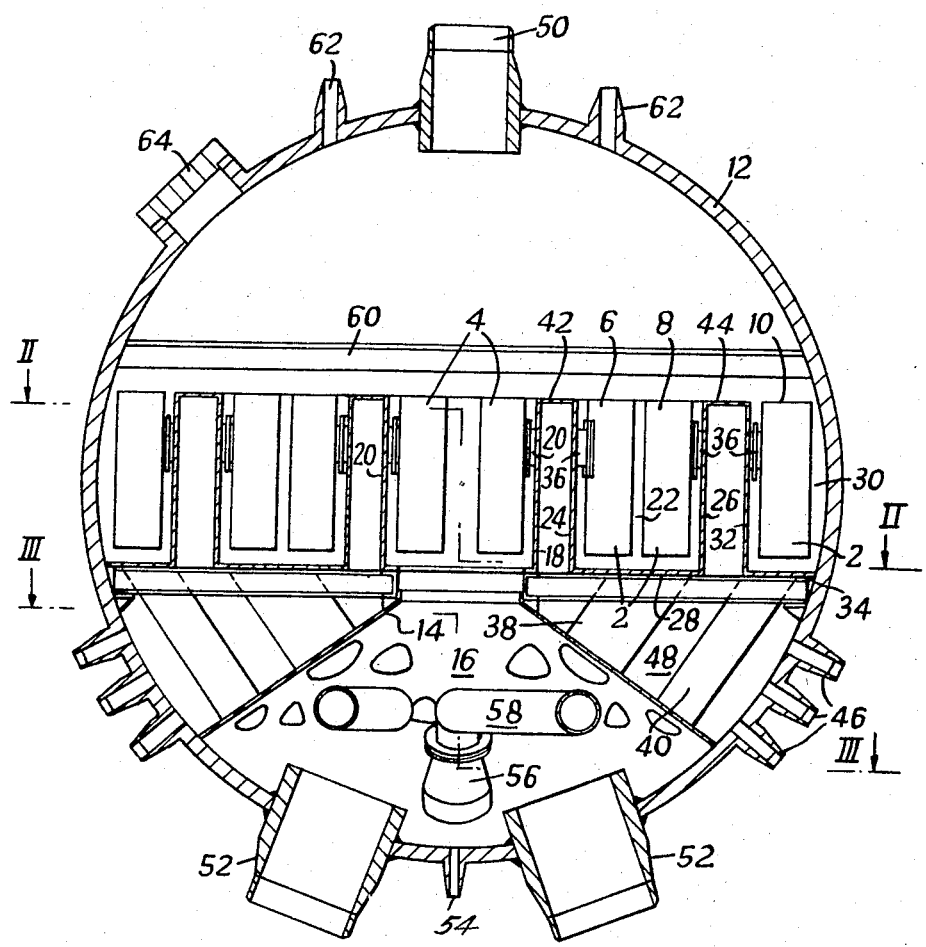
FIGURE 1 is a cross-sectional elevation, taken on the vertical diametrical plane, of separating apparatus including a spherical pressure vessel.
Figure 2:
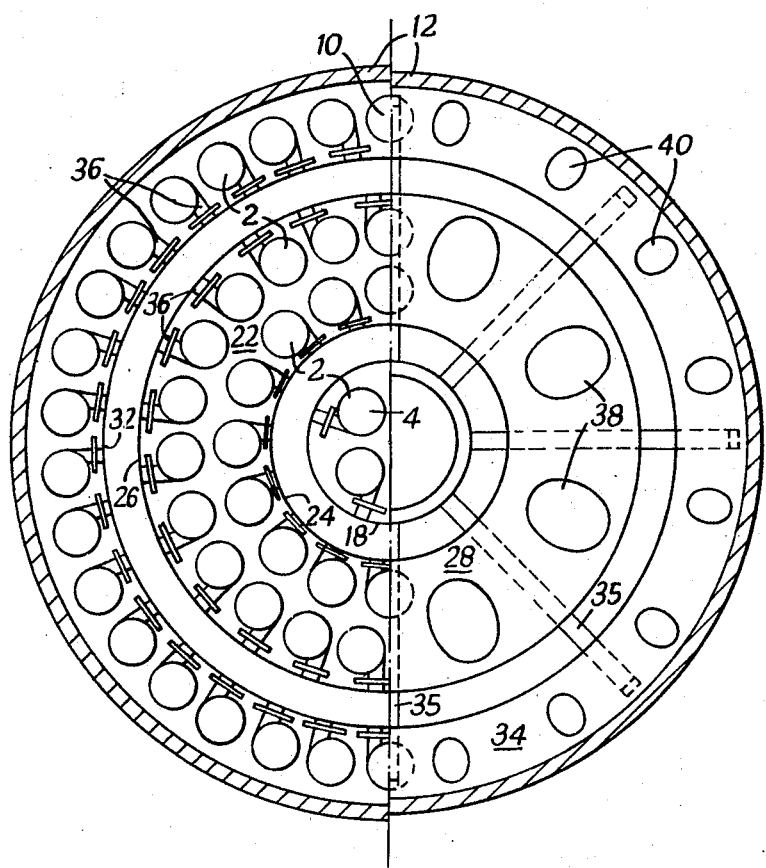
FIGURE 2 is a cross-sectional plan view taken on the staggered line II—II of FIGURE 1.
Figure 3:
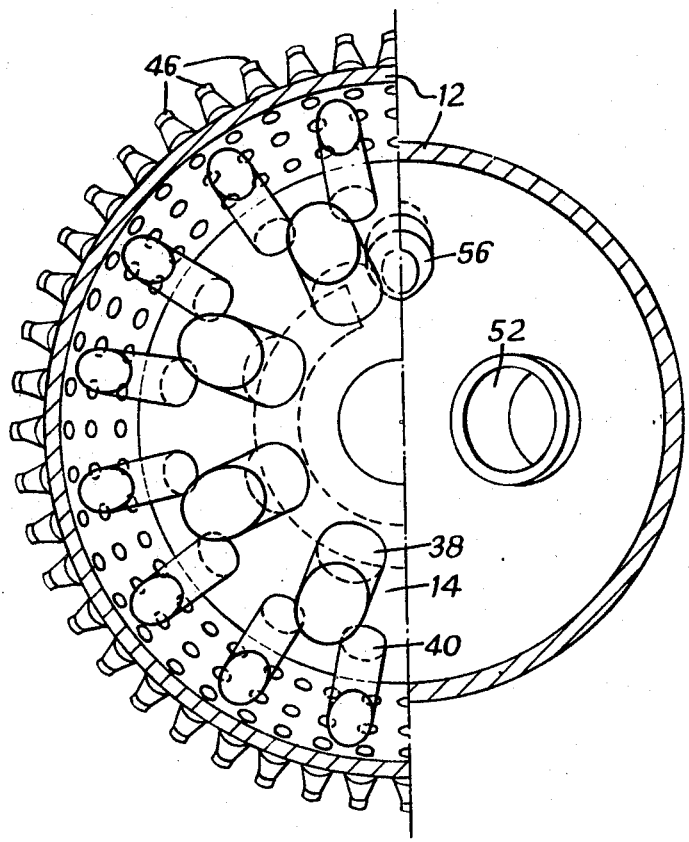
FIGURE 3 is a cross-sectional plan view taken on the staggered line III—III of FIGURE 1.

Referring to the drawings, cyclone separators 2 in which a steam-water mixture enters a separator tangentially and whirls within the separator to separate the mixture into its constituent parts by the action of centrifugal force, steam being discharged upwardly and water downwardly, are positioned in four groups 4, 6, 8, 10 on respective concentric, horizontal, pitch circles at the mid-portion of the spherical vessel 12, which is approximately 15 feet in diameter. A downwardly diverging, frusto-conical plate 14 is positioned in a lower portion of the spherical vessel 12 to define, in conjunction with the vessel wall, a separated water chamber 16. A short cylindrical duct 18 extends upwardly around the innermost group 4 of four separators from the upper edge of the frusto-conical plate 14 to level with the tops of the separators.

Apertures are formed in the cylindrical duct 18 in register with inlet ducts 20 of the individual separators of the innermost group 4 and are sealed to the inlet ducts. The two intermediate groups 6, 8 of sixteen and twenty-three separators are positioned in an inner channel 22 of annular cross-section having a pair of upright, co-axial, cylindrical walls 24, 26 extending from level with the top of the separators to an annular bottom plate 28 slightly below the separators. The outermost group 10 of thirty-four separators are positioned in an outer channel 30 of annular cross-section formed between an upright cylindrical wall 32 extending from level with the top of the separators to an annular bottom plate 34 which is connected to the wall of the pressure vessel 12 forming the outer boundary of the channel. The cyclone separators 2, the cylindrical walls 18, 24, 26 and 32 and the annular plates 28, 34, 42 and 44 are supported upon eight, equiangularly spaced, beams 35 extending between the vessel wall and the upper edge of the frusto-conical plate 14. Apertures are formed in the cylindrical walls 24, 26, 32 of the inner and outer channels 22 and 30 in register with inlet ducts 36 of the individual separators and are sealed to the inlet ducts. Discharge ducts 38, 40 extend between the annular bottom plates 28, 34 of the inner and outer channels 22, 30 and the frusto-conical plate 14 connecting the channels and the separated water chamber 16. Annular closure plates 42, 44 seal the upper end of the short cylindrical duct 18 to the upper end of the inner cylindrical wall 24 of the inner channel 22 and the upper end of the outer wall 26 of the inner channel 22 to the upper end of the inner cylindrical wall 32 of the outer channel 30. One hundred and forty-four riser tubes 46 conveying the steam-water mixture connect into the spherical vessel 12 at three levels and at intervals around the vessel intermediate the junction of the frusto-conical plate 14 and the vessel and the junction of the annular bottom plate 34 of the outer channel 30 to discharge into a space 48 defined between the frusto-conical plate 14, the short cylindrical duct 18, the inner and outer channels 22, 30 and the wall of the spherical vessel 12.

A single steam main 50 extends from the top centre portion of the sperical vessel 12, whilst two water downcomers 52 extend from the base of the spherical vessel displaced from the bottom centre portion of the vessel, which bottom centre portion is provided with a drain connection 54. As feedwater inlet 56 provided with a thermal sleeve is connected to a toroidal distributor 58 within the separated water chamber 16. A steam scrubber 60 is positioned above the separators 2 further to remove moisture from the steam, the water so removed draining into the short cylindrical duct 18 or the inner and outer channels 22 and 30. Four safety valves 62 are connected into the upper portion of the spherical vessel at equiangular intervals and a single manhole 64 is provided in the upper portion to permit access to be gained to the interior of the vessel.

In operation, when the separating apparatus is associated with a steam generating, heavy water, nuclear reactor, a mixture of steam and water flows through the riser tubes 46 from the reactor and is discharged into the space 48 and enters the individual separators 2. Within the separators, the velocity of flow of the mixture urges the mixture in a spiral flow path and the resulting centrifugal forces effect separation of the mixture into water, which is discharged downwardly to the separated water chamber 16, and into steam, which is discharged upwardly, through the scrubber 60 to the saturated steam outlet main 50. Feed water from the toroidal distributor 58 is mixed with the separated water in the separated water chamber 16 and is discharged, together with the separated water, through the downcomers 52 to the reactor.

It will be appreciated that, when the separating apparatus is associated with a steam generating, heavy water nuclear reactor, by utilising a spherical vessel a minimum of space is occupied by the separating apparatus in a biological containment structure housing the reactor and separating apparatus commensurate with the provision of sufficient individual separating means to ensure the required degree of separation of the mixture. Similarly, by utilising a spherical vessel, the weight of the vessel is a minimum and also the internal surface area of the vessel is a minimum, for a given volume which is advantageous if it is required to line the interior of the vessel. Since a plurality of mixture inlets are distributed around the vessel, the pipework connecting a nuclear reactor core and the vessel may be of simplified design and a good distribution of mixture to the separators is ensured.

It will be appreciated that, if desired, the frusto-conical plate 14 and the space 48 may be dispensed with, the separators 2 discharging to a common water space in the lower half of the spherical pressure vessel 12, ducts being provided connecting the riser tubes 46 and the inner and outer channels 22, 30.

It will be appreciated that the cyclone separators 2 may be replaced by other forms of separators and that, when the separating apparatus is used in conjunction with a steam generating, heavy water nuclear reactor, a series of baffles may well suffice to give the requisite degree of separation.

We claim:

1. Apparatus for separating vapor and liquid from a mixture of vapor and liquid comprising, a substantially spherical pressure vessel having a vapor outlet in the upper portion and a liquid outlet in the lower portion thereof, a plurality of vapor and liquid separating means positioned adjacent a horizontal diametrical plane of said vessel and arranged in concentric groups, each of said separating means being arranged to discharge separated vapor upwardly into the upper portion and to discharge separated liquid downwardly into the lower portion of said vessel, upright cylindrical concentric walls connected by upper annular plates positioned between concentric groups of said separating means and defining therebetween inlet channels to said separating means, flow ducts connecting said channel with each of said separating means, a plurality of vapor and liquid mixture inlets distributed around the lower portion of said vessel, means connecting said vapor and liquid inlets with said inlet channels and forming an annular vapor and liquid space, and means for separately passing said separated liquid from said separating means to the liquid outlet from said vessel.

2. Apparatus for separating vapor and liquid from a mixture of vapor and liquid as claimed in claim 1, wherein said means connecting said inlets and said separating means include a frusto-conical plate cooperating with said inlet channels to define an annular vapor and liquid space in the lower portion of said vessel, and the vapor and liquid mixture inlets discharge to the said space.

3. Apparatus for separating vapor and liquid as claimed in claim 2 wherein lower annular plates spaced beneath said separating means are attached to the lower ends of said cylindrical concentric walls on opposite sides of said channels, and conduits extend through said annular vapor and liquid space to penetrate said lower annular plates and connect the liquid outlets from said separating means with the lower portion of said vessel for discharge through said vessel liquid outlet.

References Cited

UNITED STATES PATENTS

| | | | |
|---|---|---|---|
| 2,368,211 | 1/1945 | Fletcher | 122—488 |
| 2,395,855 | 3/1946 | Fletcher | 55—349 |
| 2,594,490 | 4/1952 | Patterson | 55—345 X |
| 2,765,918 | 10/1956 | Fontein et al. | 55—346 X |
| 2,845,906 | 8/1958 | Gram Jr. | |
| 2,862,479 | 12/1958 | Blaser et al. | |
| 2,923,377 | 2/1960 | Schlunderberg | 55—349 |
| 3,057,333 | 10/1962 | Kuhner. | |
| 3,066,088 | 11/1962 | Blaser | 122—491 X |
| 3,086,343 | 4/1963 | Stern | 55—346 X |
| 3,227,142 | 1/1966 | Bell et al. | 122—34 |
| 3,253,999 | 5/1966 | Weisman | 55—348 X |
| 3,296,779 | 1/1967 | Daman et al. | 55—447 X |

HARRY B. THORNTON, *Primary Examiner.*

S. W. SOKOLOFF, *Assistant Examiner.*